(12) United States Patent
Shi et al.

(10) Patent No.: US 12,232,114 B2
(45) Date of Patent: Feb. 18, 2025

(54) METHOD AND APPARATUS FOR DATA INDICATION

(71) Applicant: LENOVO (BEIJING) LIMITED, Beijing (CN)

(72) Inventors: Jie Shi, Beijing (CN); Lianhai Wu, Beijing (CN); Jing Han, Beijing (CN); Haiming Wang, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 435 days.

(21) Appl. No.: 17/633,739

(22) PCT Filed: Aug. 8, 2019

(86) PCT No.: PCT/CN2019/099808
§ 371 (c)(1),
(2) Date: Feb. 8, 2022

(87) PCT Pub. No.: WO2021/022557
PCT Pub. Date: Feb. 11, 2021

(65) Prior Publication Data
US 2022/0400507 A1 Dec. 15, 2022

(51) Int. Cl.
*H04W 72/20* (2023.01)
*H04W 68/00* (2009.01)

(52) U.S. Cl.
CPC ......... *H04W 72/20* (2023.01); *H04W 68/005* (2013.01)

(58) Field of Classification Search
CPC ............................ H04W 68/005; H04W 72/20
See application file for complete search history.

(56) References Cited

U.S. PATENT DOCUMENTS

| | | | | |
|---|---|---|---|---|
| 2017/0006034 | A1* | 1/2017 | Link, II | H04L 63/08 |
| 2020/0351022 | A1* | 11/2020 | Choe | H04L 1/1664 |
| 2020/0383085 | A1* | 12/2020 | Shih | H04W 72/1268 |
| 2021/0014011 | A1* | 1/2021 | Xiong | H04L 1/1887 |
| 2022/0015030 | A1* | 1/2022 | Wang | H04W 48/02 |
| 2022/0015152 | A1* | 1/2022 | Chen | H04W 74/0833 |
| 2022/0039046 | A1* | 2/2022 | Ianev | H04W 24/08 |
| 2022/0053572 | A1* | 2/2022 | Pham Van | H04W 74/0841 |
| 2022/0159532 | A1* | 5/2022 | Lu | H04W 36/0038 |
| 2022/0167433 | A1* | 5/2022 | Tirronen | H04W 74/0841 |

(Continued)

FOREIGN PATENT DOCUMENTS

| | | |
|---|---|---|
| CN | 109863783 A | 6/2019 |
| WO | 2019097104 A1 | 5/2019 |

OTHER PUBLICATIONS

International Searching Authority, "Written Opinion of the International Searching Authority," PCT/CN2019/099808, Apr. 30, 2020, pp. 1-6.

(Continued)

*Primary Examiner* — Melanie Jagannathan
(74) *Attorney, Agent, or Firm* — Kunzler Bean & Adamson

(57) ABSTRACT

Embodiments of the present application are directed to a method and apparatus for data indication in an MT-EDT procedure. In an embodiment of the present application, the method includes receiving DL data from a base station in an MT-EDT procedure; and determining whether to transmit UL data associated with the DL data in the MT-EDT procedure.

20 Claims, 12 Drawing Sheets

(56) References Cited

U.S. PATENT DOCUMENTS

| | | | |
|---|---|---|---|
| 2022/0167438 A1* | 5/2022 | Shrestha | H04W 76/20 |
| 2022/0201647 A1* | 6/2022 | Choe | H04W 68/005 |
| 2022/0201744 A1* | 6/2022 | Shrestha | H04W 76/27 |
| 2022/0256606 A1* | 8/2022 | Pham Van | H04L 5/0053 |
| 2022/0400520 A1* | 12/2022 | Lu | H04W 74/006 |
| 2024/0260039 A1* | 8/2024 | Lei | H04W 68/02 |

OTHER PUBLICATIONS

Intel Corporation, Early data transmission discussion for eFeMTC and FeNB-IoT, 3GPP TSG RAN WG2 Meeting #100, R2-1712639, Nov. 27-Dec. 1, 2017, pp. 1-4, Reno, USA.

Ericsson, MT early data in Msg4, 3GPP TSG-RAN WG2 #106, R2-1906929, May 13-17, 2019, pp. 1-8, Reno, Nevada, USA.

Huawei, Report of email discussion [99bis#55][MTC/NB-IoT] EDT RRC messages, 3GPP TSG-RAN WG2 Meeting #100, R2-1713182, Nov. 27-Dec. 1, 2017, pp. 1-29, Reno, USA.

* cited by examiner

METHOD AND APPARATUS FOR DATA INDICATION

TECHNICAL FIELD

Embodiments of the present application generally relate to wireless communication technology, especially to a method and apparatus for data indication in a mobile terminated (MT) early data transmission (EDT) (MT-EDT) procedure.

BACKGROUND

For improving efficiency of data transmission, techniques of EDT are introduced for some networks, e.g., narrow band-internet of things (NB-IoT), enhanced machine type communication (eMTC), etc. EDT includes mobile originating EDT (MO-EDT) and mobile terminated EDT (MT-EDT).

According to protocol of EDT, a user equipment (UE) transmits a preamble to a base station (BS) for accessing network. In response to the preamble, the base station transmits a response to the user equipment. Some downlink data from the base station to the user equipment can be transmitted with the response.

In an MT-EDT procedure, downlink (DL) data will be transmitted from a core network (CN) node to a UE, and the BS will transmit an MT-EDT indication to the UE in a paging message. The CN node can be for example, a mobility management entity (MME), a serving gateway (S-GW), an access and mobility management function (AMF), or a user plane function (UPF). In response to the DL data, the UE may transmit an application acknowledge (ACK) from an application layer to the BS. However, besides the application ACK, the UE may have uplink (UL) data associated with the DL data necessary to be transmitted to the BS. In some cases, the UE may not transmit the ACK to the BS, while have UL data associated with the DL data necessary to be transmitted to the BS. Therefore, how to indicate, for example to the BS, whether the UE has UL data feedback or UL data to be transmitted needs to be solved.

In addition, a UE may need to transmit MO Data in an MT-EDT procedure. How to define UE's behaviour to solve this issue also needs to be solved.

SUMMARY OF THE APPLICATION

Embodiments of the present application provide a method and apparatus for data indication in an MT-EDT procedure.

An embodiment of the present application provides a method. The method may include: receiving DL data from a base station in an MT-EDT procedure, and determining whether to transmit UL data associated with the downlink data in the MT-EDT procedure.

Another embodiment of the present application provides a method. The method may include: transmitting DL data to a UE in an MT-EDT procedure; and determining whether to receive a UL data associated with the DL data based on a paging message or a DL data arriving message from a CN node in the MT-EDT procedure, wherein the paging message or the DL data arriving message includes information indicating whether the UE will transmit the UL data associated with the DL data.

Yet another embodiment of the present application provides a method. The method may include: determining whether a UE will transmit UL data associated with downlink data from a base station in an MT-EDT procedure based on received information; and transmitting information indicating whether the UE will transmit the UL data associated with the DL data to the base station.

Yet another embodiment of the present application provides a method. The method may include: receiving DL data in an MT-EDT procedure; and receiving a scheduling request (SR) configuration in the MT-EDT procedure.

Yet another embodiment of the present application provides a method. The method may include: transmitting downlink (DL) data to a UE in an MT-EDT procedure, and transmitting an SR configuration to the UE.

Yet another embodiment of the present application provides a method. The method may include receiving a paging message with MT-EDT indication; determining whether there is UL data to be transmitted; and in response to there is UL data to be transmitted, initiating a Msg.2 based MT-EDT procedure in the case that the Msg.2 based MT-EDT procedure is applied; or initiating MO-EDT in the case that a Msg.4 based MT-EDT procedure is applied.

Yet another embodiment of the present application provides a method. The method may include transmitting a paging message with MT-EDT indication, and receiving information indicating whether there is UL data to be received.

Yet another embodiment of the present application provides a method. The method may include: receiving DL data from a BS in an MT-EDT procedure, and determining whether to transmit UL data in the MT-EDT procedure.

Yet another embodiment of the present application provides a method. The method may include: transmitting DL data to a UE in an MT-EDT procedure, and determining whether to receive UL data based on the message from UE in the MT-EDT procedure.

Yet another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

The embodiments of the present application can efficiently avoid wasting UL grant and avoid the uncertainty of data availability information.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
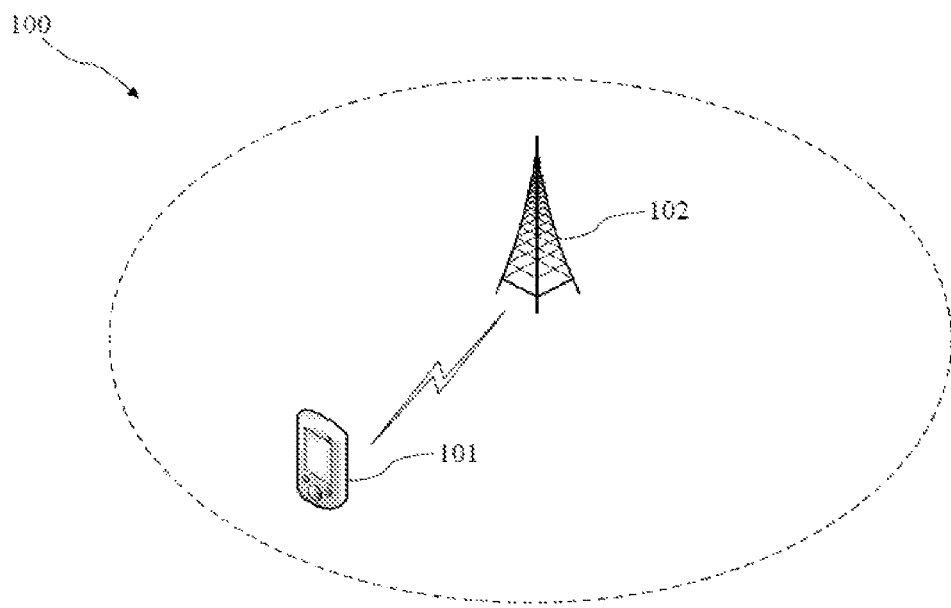
FIG. 1 illustrates a wireless communication system according to some embodiments of the present application.

FIG. 1 illustrates a wireless communication system according to some embodiments of the present application.

Referring to FIG. 1, a wireless communication system 100 may include a user equipment (UE) 101 and a base station (BS) 102. Although a specific number of UE 101 and BS 102 are depicted in FIG. 1, it is contemplated that any number of UEs 101 and BSs 102 may be included in the wireless communication system 100.

A BS 102 may be distributed over a geographic region, and may communicate with a core network (CN) node. The CN node may include an MME, an S-GW, or an AMF, or a UPF. In addition, the CN node may also include a Home Subscriber Server (HSS), which communicatively coupled with the MME. In some embodiments of the present application, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s) 102.

A UE 101 may directly communicate with the BS 102 via uplink communication signals. The UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

In some embodiments of the present application, a UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, or the like.

According to some embodiments of the present application, a UE 101 may include, for example, but is not limited to, a portable wireless communication device, a smart phone, a cellular telephone, a flip phone, a device having a subscriber identity module, a personal computer, a selective call receiver, or any other device that is capable of sending and receiving communication signals on a wireless network.

In addition, in some embodiments of the present application, a UE 101 may include, for example, but is not limited to, wearable devices, such as smart watches, fitness bands, optical head-mounted displays, or the like.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3GPP-based network, a 3GPP 5G network, a satellite communications network, a high altitude platform network, and/or other communications networks.

In some embodiments of the present application, the wireless communication system 100 is compatible with the 5G new radio of the 3GPP protocol, wherein BSs 102 transmit data using an OFDM modulation scheme on the DL and UE 101 transmit data on the UL using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the BS 102 may communicate using other communication protocols, such as the IEEE 802.11 family of wireless communication protocols. Further, in some embodiments of the present application, the BS 102 may communicate over licensed spectrums, whereas in other embodiments the BS 102 may communicate over unlicensed spectrums. The present application is not intended to be limited to the implementation of any particular wireless communication system architecture or protocol. In yet some embodiments of present application, the BS 102 may communicate with UE 101 using the 3GPP 5G protocols.

In an MT-EDT procedure, downlink (DL) data will be transmitted from a CN node (not shown FIG. 1) to a UE 101, and the BS 102 will transmit an MT-EDT indication to the UE 101 in a paging message. The CN node can be an MME in a CP, an S-GW in a UP, an AMF for CP, or a UPF for UP. CP and UP are two different procedures for a CN node in an MT-EDT procedure. For a CP procedure, data will be transmitted from the CN node, e.g., an MME to a BS, e.g., eNB. For a UP procedure, DL data will be transmitted from the CN node, e.g., an S-GW to the BS, e.g., eNB.

According to some existing agreements for MT-EDT, a UE 101 may transmit a random access (RA) preamble (e.g., Message 1 of MT-EDT) to a BS 102 according to a dedicated random access channel (RACH) resource used for a contention-free RACH procedure. Then, the BS 102 may transmit some DL data to the UE 101 by an RA response (e.g., Message 2 of MT-EDT) in response to the RA preamble. According to some embodiments of the present application, there are two kinds of MT-EDT procedures for the DL data transmitted in random access (RA) procedure, i.e., a Msg.2 based MT-EDT procedure and a Msg.4 based MT-EDT procedure. Specifically, an MT-EDT procedure that includes operation of transmitting DL data by Message 2 may be referred to as an Msg.2 based MT-EDT procedure. Similarly, an MT-EDT procedure that includes operation of transmitting DL data by Message 4 may be referred to as an Msg.4 based MT-EDT procedure. The DL data triggered by paging may be firstly transmitted in Msg. 4 during the Msg.4 based MT-EDT procedure. Some embodiments for illustrating the Msg.2 based MT-EDT procedure and the Msg.4 based MT-EDT procedure will be respectively described in detail in view of FIGS. 2 and 3.

Figure 2:
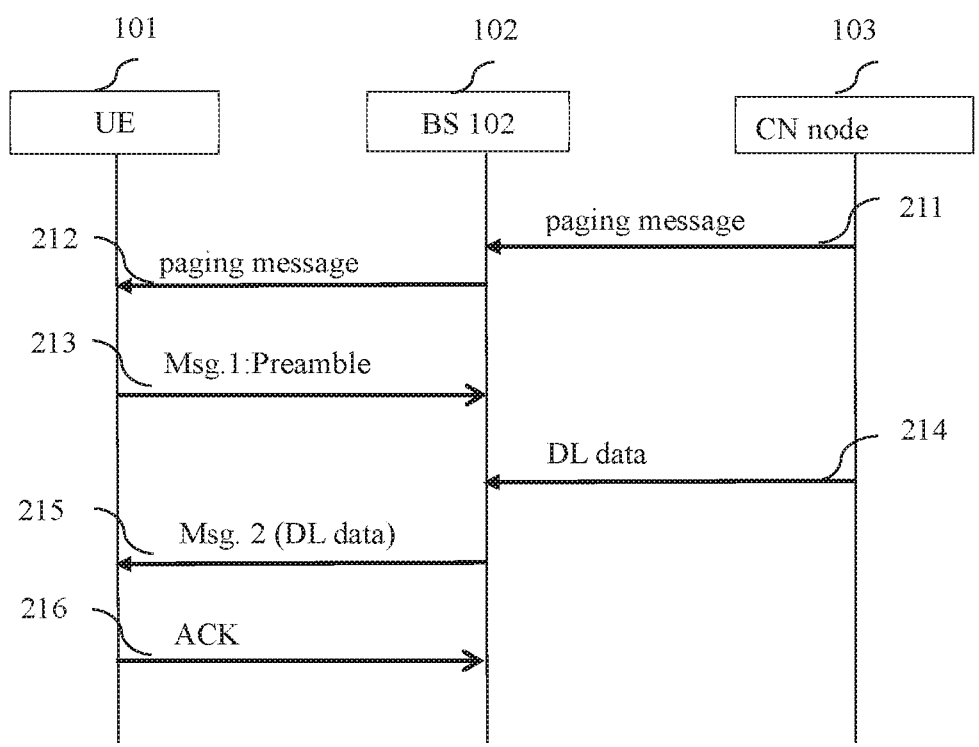
FIG. 2 is a schematic view of message transmission in a Msg.2 based MT-EDT procedure according to some embodiments of the present application.

FIG. 2 is a schematic view of message transmission in a Msg.2 based MT-EDT procedure according to some embodiments of the present application. The Msg.2 based MT-EDT procedure shown in FIG. 2 is a contention-free RA procedure among a UE 101, a BS 102 and a CN node 103.

As shown in FIG. 2, in the Msg.2 based MT-EDT procedure, in step 211, a CN node 103 may transmit a paging message to the BS 102, which can may include UE identity (ID) and DL data information. The CN node 103 can be an MME, an S-GW, an AMF, or a UPF.

In step 212, after receiving the paging message, the BS 102 may transmit a paging message to the UE 101, which may include pre-configured information such as an MT-EDT indication, a dedicated RACH resource for a contention-free RACH procedure, and/or UE-specific Radio Network Temporary Identity (RNTI) information for indicating UE ID.

After receiving the paging information form the BS 102, the UE 101 may find its UE ID in the paging message. In step 213, the UE 101 will transmit a RA preamble (i.e., Message 1 (or Msg.1) of MT-EDT) to the BS 102 according to the dedicated RACH resource for a contention-free RACH procedure.

After transmitting the paging message to the UE 101, the BS 102 will monitor the preamble on the RACH resource. After the RA preamble for a dedicated UE on the dedicated RACH resource is monitored, the BS 102 will request DL data from the CN node 103, so that it can transmit the DL data in response to Msg.1 to the UE 101. Accordingly, in step 214, the BS 102 may receive the DL data from the CN node 103.

In step 215, the BS 102 will transmit the received DL data to the UE 101 by a RA response (i.e., Message 2 (or Msg.2) of MT-EDT) in response to Msg.1 from the UE 101.

After successfully receiving the DL data (which generally means the DL data can be successfully decoded by the UE 101, hereafter the same), in step 216, the UE 101 will transmit a physical uplink control channel (PUCCH) acknowledge (ACK) associated with the DL data to the BS 102, which can also be a radio resource control (RRC) message.

Figure 3:
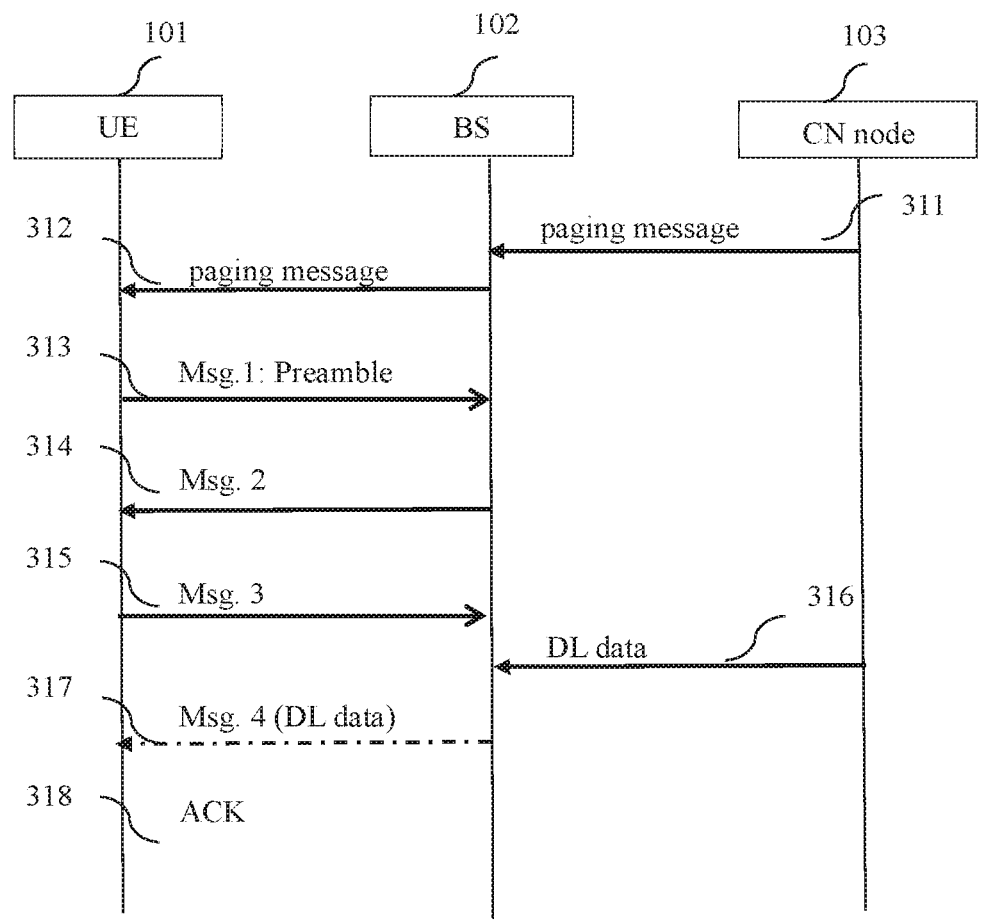
FIG. 3 is schematic view of message transmission in a Msg.4 based MT-EDT procedure according to some embodiments of the present application.

FIG. 3 is a schematic view of message transmission in a Msg.4 based MT-EDT procedure according to some embodiments of the present application. The Msg.4 based MT-EDT procedure shown in FIG. 3 could be also a contention-based RA procedure among a UE 101, a BS 102 and a CN node 103.

As shown in FIG. 3, in the Msg.4 based MT-EDT procedure, in step 311, a CN node 103 may transmit a paging message to the BS 102, which can may include UE identity (ID) and DL data information to BS 102. The CN node 103 can be an MME in a CP, an S-GW in a UP, an AMF for CP, or a UPF for UP.

In step 312, after receiving the paging message, the BS 102 may transmit a paging message information to the UE 101, which may include pre-configured information such as an MT-EDT indication, a RACH resource for a contention-based RACH procedure, and/or UE-specific RNTI information for indicating UE ID.

After receiving the paging information form the BS 102, the UE 101 may find its UE ID in the paging message. In step 313, the UE 101 will transmit a RA preamble (i.e., Message 1 (or Msg.1) of MT-EDT) to the BS 102 according to the RACH resource in the paging message. Since the Msg.4 based MT-EDT procedure is a contention-based RA procedure, the RACH resource could be shared by multiple UE including the UE 101 itself.

After receiving the RA preamble from the UE 101, in step 314, the BS 102 will send a random access response (RAR) (i.e., Message 2 (or Msg.2) of MT-EDT) to the UE 101.

After receiving the RAR information from the BS 102, in step 315, the UE 101 will send an RRC message (i.e., Message 3 (or Msg.3) of MT-EDT) to the BS 102, this RRC message may include UE resume ID, or UE-international mobile subscriber identity (IMSI) information indicating its UE ID. After transmitting the RAR information to the UE 101, the BS 102 will monitor the RRC message from UE 101. After the RRC message is monitored, the BS 102 could identify the UE ID information, and will request DL data from the CN node 103, so that it can transmit the DL data to the UE 101. Accordingly, in step 316, the BS 102 may receive the DL data from the CN node 103. In step 317, the BS 102 will transmit the received DL data to the UE 101 (i.e., Message 4 (or Msg. 4) of MT-EDT).

After successfully receiving the DL data (which generally means the DL data can be successfully decoded by the UE 101, hereafter the same), in step 318, the UE 101 will transmit a PUCCH ACK associated with the DL data or a RRC message to the BS 102.

As discussed above, for the MT-EDT procedure (both the Msg.2 based MT-EDT procedure and the Msg.4 based MT-EDT procedure), a UE 101 can receive DL data from a BS 102, and the UE 101 can transmit an application ACK, e.g., a PUCCH ACK in response to the DL data. However, besides the ACK, it is also possible that the UE 101 may need to transmit other UL data associated with the DL data. To transmit the UL data, the UE 101 needs a UL grant from the BS 102. Accordingly, the BS 101 needs to know whether the UE 101 has the UL data associated with the DL data to be transmitted, so that the BS 101 could make decision whether a UL grant for the UL data needs to be transmitted to UE.

According to some embodiments of the present application, before a Msg.2 based MT-EDT or Msg.4 based MT-EDT procedure, the information indicating whether the UE 101 has the UL data associated with the DL data to be transmitted may be configured by a non-access stratum (NAS) signaling. The NAS signaling means a signaling procedure that the non-access stratum information needs to be exchanged between the UE 101 and the BS 103. In a CP procedure, a UL NAS signalling message or UL NAS message carrying data can be transmitted in a UL RRC container message. A DL NAS signalling or DL NAS data can be transmitted in a DL RRC container message.

By the NAS signaling, a UE 101 can transmit information indicating the UE 101 has the UL data associated with the DL data to be transmitted to the CN node 103. Then the CN node 103 will transmit this information to the BS 102. The NAS procedure can be an Attach or a tracking area updating (TAU) procedure. That is, the information indicating whether the UE has the UL data associated with the DL data to be transmitted may be transmitted in the TAU or Attach procedure. Based on the NAS procedure, the BS 102 could know whether the UE 101 will have UL data in response to the DL data in an MT-EDT procedure.

Figure 4:
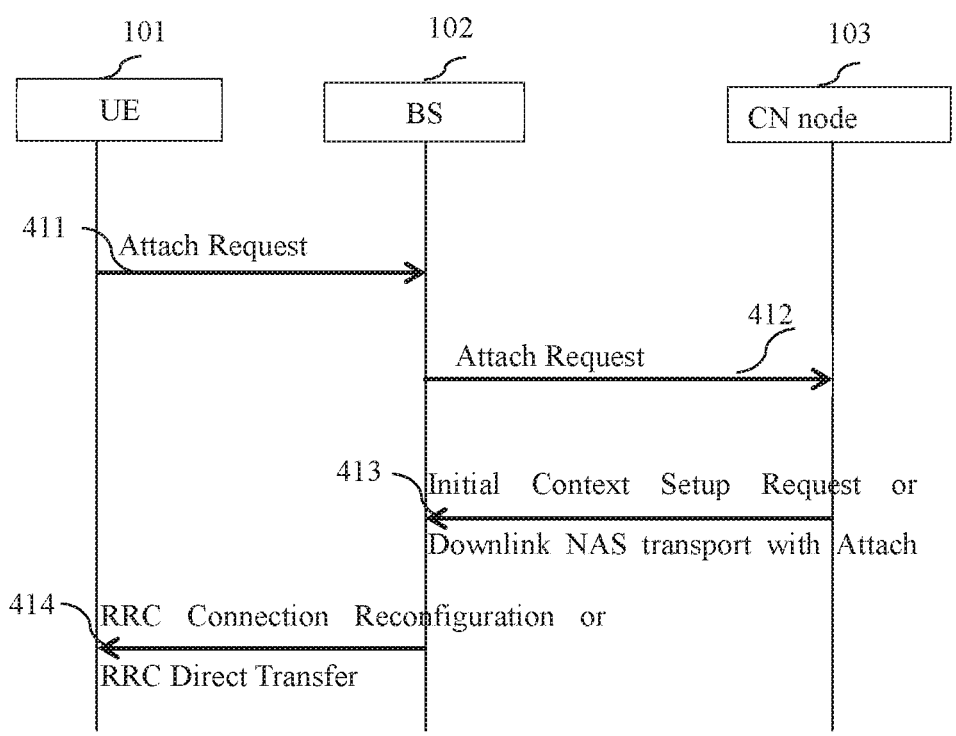
FIG. 4 illustrates an ATTACH procedure between a UE, a BS, and a CN node according to some embodiments of the present application.

FIG. 4 illustrates an ATTACH procedure among a UE 101, a BS 102, and a CN node 103 according to some embodiments of the present application.

As shown in FIG. 4, in step 411, the UE 101 may transmit an Attach request message to the BS 102. In step 412, the BS 102 can transparently transfer the received Attach request message to the CN node 103 (such as an MME). The information indicating whether the UE has the UL data associated with the DL data to be transmitted can be included in the Attach request message. After receiving the Attach request message, the CN node 103 may transmit an initial context setup request message or downlink NAS transport with an Attach Accept message to the BS 102 in step 413. Similarly, in step 414, after receiving the initial context setup request message or downlink NAS transport with an Attach Accept message, the BS 102 may transmit RRC Connection Reconfiguration message signal or RRC Direct Transfer message to the UE 101.

Figure 5:
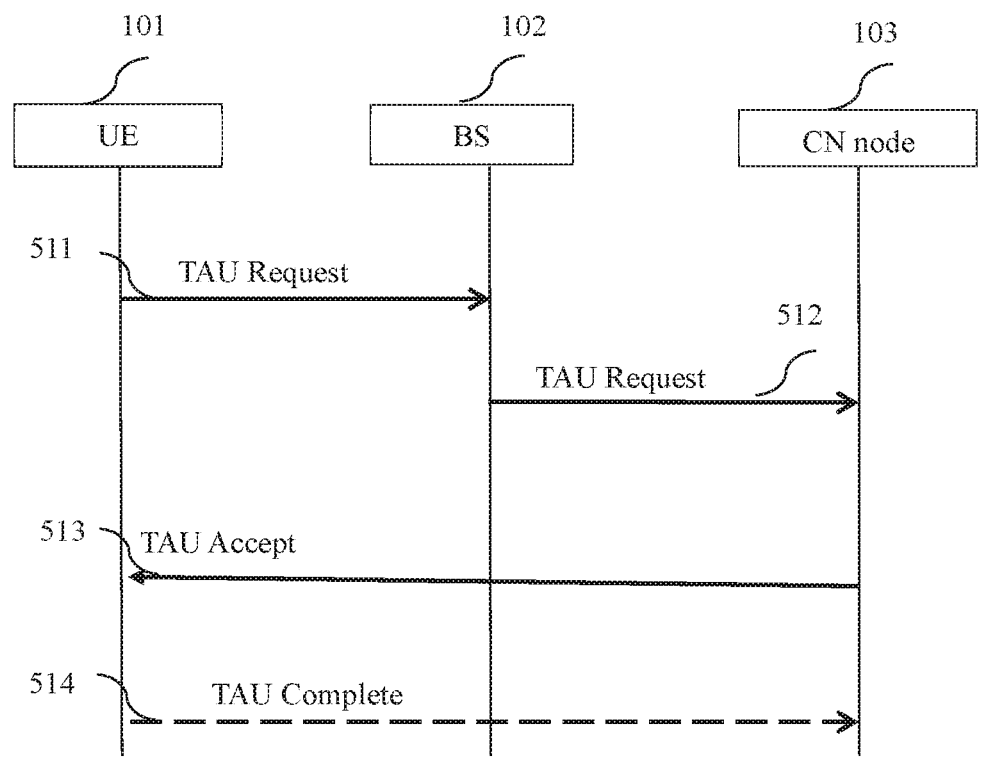
FIG. 5 illustrates a TAU procedure between a UE, a BS, and a CN node according to some embodiments of the present application.

FIG. 5 illustrates a TAU procedure between a UE 101, a BS 102, and a CN node 103 according to some embodiments of the present application.

As shown in FIG. 5, in step 511, the UE 101 may transmit a TAU request message to the BS 102. In step 512, the BS 102 can transparently transfer the received TAU request message to the CN node 103 (such as an MME). The information indicating whether the UE has the UL data associated with the DL data to be transmitted can be included in the TAU request message. After receiving the Attach request message, the CN node 103 may transmit a TAU Accept message to UE 101 in step 513. In step 514, after receiving the TAU Accept message, the UE 101 may transmit a TAU Complete message to the CN node 103 or not, and thus FIG. 5 shows this TAU Complete message in a dashed line.

According to some embodiments of the present application, before a Msg.2 based MT-EDT or Msg.4 based MT-EDT procedure, the information indicating whether the UE 101 has the UL data associated with the DL data to be transmitted can be determined by the CN node 103 from a server outside from the CN node 103, e.g., an application server, or information stored in the CN node 103.

Some embodiments of the present application more specifically illustrate a Msg.2 based MT-EDT procedure, e.g., as shown in FIG. 2, wherein the UE transmits information indicating whether it will transmit the UL data associated with the DL data to the CN node 103 during an Attach procedure, e.g. as shown in FIG. 4.

In an MT-EDT procedure, after receiving DL data from a BS 102, a UE 101 will determine whether it intends to transmit UL data associated with the DL data (such as application UL data), which can be a feedback of the DL data or a response to the DL data based on its preference set. For example, the UE 101 may send information indicating whether it will transmit the UL data associated with the DL data to the CN node 103 in an Attach message during an Attach procedure or in a TAU request message during a TAU procedure. The information may indicates that the UE will transmit the UL data associated with the DL data, the UE will not transmit the UL data associated with the DL data, or whether the UE will transmit the UL data associated with the DL data is uncertain.

After receiving the information indicating whether the UE 101 will transmit the UL data associated with the DL data, CN node 103 may configure this information to the BS 102 in a paging message or DL data arriving message. For example, as shown in FIG. 2, in the Msg.2 based MT-EDT procedure, the CN node 103 may transmit the information indicating whether the UE 101 will transmit the UL data associated with the DL data to the BS 102 via the paging message or the DL data arriving message in step 211. Then, after receiving the DL data in step 214, the BS 102 can determine whether to allocate a UL grant to the UE 101 based on the indication information from the CN node 103. In the case that the indication information indicates that the UE 101 will transmit the UL data associated with the DL data, the BS 102 may determine to allocate a UL grant to the UE 101 so that it can transmit the UL data associated with the DL data. In the case that the indication information indicates that the UE 101 will not transmit the UL data associated with the DL data, the BS 102 may determine not to allocate a UL grant to the UE 101 to avoid wasting UL resource. In the case that the indication information indicates that the UE 101 is not certain to transmit the UL data associated with the DL data, the BS 102 may determine allocate a UL grant to the UE 101 or not based on a plurality of factors, such as the history information in an MT-EDT procedure between this UE or a BS, e.g., eNB.

In another example, as shown in FIG. 3, in the Msg.4 based MT-EDT procedure, the CN node 103 may transmit the information indicating whether the UE 101 will transmit the UL data associated with the DL data to the BS 102 via the paging message or the DL data arriving message in step 311. Then, after receiving the DL data in step 316, the BS 102 can determine whether to allocate a UL grant to the UE 101 based on the indication information from the CN node 103. In the case that the indication information indicates that the UE 101 will transmit the UL data associated with the DL data, the BS 102 may determine to allocate a UL grant to the UE 101 so that it can transmit the UL data associated with the DL data. In the case that the indication information indicates that the UE 101 will not transmit the UL data associated with the DL data, the BS 102 may determine not to allocate a UL grant to the UE 101 to avoid wasting UL resource. In the case that the indication information indicates that the UE 101 is not certain to transmit the UL data associated with the DL data, the BS 102 may determine allocate a UL grant to the UE 101 or not based on a plurality of factors.

The information indicating whether the UE will transmit the UL data associated with the DL data can be per UE level in some embodiments of the present application. For example, when the information is per UE level, the information may indicate that, with respect to a specific UE, there always is UL data associated with the DL data, or there is no UL data associated with the DL data.

The information indicating whether the UE will transmit the UL data associated with the DL data can be per the application-level in some other embodiments of the present application. The application-level can be mapped to service, traffic, bearer or logical channel level of the UE 101. That is, when the information is per application-level, the information is associated with the service, traffic, bearer, or logical channel-level of the UE 101. The information could be mapped to a dedicated service, traffic, bearer, or logical channel of the UE. For example, the CN node 103 can determine whether a UE 101 will transmit the UL data associated with the DL data based on the stored information or received application information on the corresponding UE 101. The information may indicate: the UE will transmit UL data associated with the DL data; the UE will not transmit UL data associated with the DL data, or whether the UE will transmit the UL data associated with the DL data is uncertain.

More specifically, in some cases, the UE 101 will generate UL data associated with the DL data, the information may indicate that the UE will transmit the UL data associated with the DL data. In some other cases, the UE 101 will not generate any UL data associated with the DL data, and the information may indicate that the UE will not transmit the UL data associated with the DL data. In some other cases, the UE 101 itself is uncertain on whether it will generate the UL data associated with the DL data, and the information may indicate that the UE 101 is uncertain whether it will transmit the UL data associated with the DL data.

In some embodiments of the present application, in an MT-EDT procedure, the information indicating whether the UE will transmit the UL data associated with the DL data may be the information indicating whether the UE will generate the UL data associated with the DL data. Similarly, the information indicating whether the UE will generate the UL data associated with the DL data indicate: the UE will generate UL data associated with the DL data, the UE will not generate UL data associated with the DL data, or whether the UE will generate UL data associated with the DL data is uncertain. Persons skilled in the art should understand that although they are expressed in different manners, they actually have the same use or function, both for help the BS 102 determine whether it will receive UL data associated the DL data from the UE 101.

In some embodiments of the present application, in an MT-EDT procedure, the information indicating whether the UE will transmit the UL data associated with the DL data may be the information indicating whether the UE intends to transmit UL data as feedback of the DL data, or indicating whether the UE intends to send UL response to the DL data.

According to some embodiments of the present application, when the information indicating whether the UE 101 has the UL data associated with the DL data to be transmitted is determined by the CN node 103, the CN node 103 may configure the information indicating whether the UE 101 will transmit the UL data associated with the DL data and transmit it to the UE 101 and the BS 102. For example, in order to configure the information to the UE 101, the initial context setup request message, the downlink NAS transport with Attach Accept message in step 413, and the RRC Connection Reconfiguration message, or the RRC Direct Transfer message in step 414 may include the information indicating whether the UE 101 will transmit the UL data associated with the DL data. That is, through steps 413 and 414, the CN node 103 may configure this information to the UE 101. In addition, the CN node 103 may configure this information to the BS 102 in a paging message or DL data arriving message, which has been described above in view of FIGS. 2 and 3, and will not be repeated here.

Similarly, according to some embodiments of the present application, the CN node 103 may configure the information to UE 101 through the TAU procedure, which indicates whether the UE 101 will transmit the UL data associated with the DL data. For example, the TAU Accept message in step 513 shown in FIG. 5 may include the information indicating whether UE 101 will transmit the UL data associated with the DL data. In addition, the CN node 103 may configure this information to the BS 102 in a paging message or DL data arriving message, which has been described above in view of FIGS. 2 and 3 and will be not repeated here.

In another embodiment, for example, in the Msg.4 based MT-EDT procedure, as shown in FIG. 3, after receiving the RAR information, in step 315, the UE 101 will send a RRC message and indication information indicating whether the UE 101 has UL data is to be transmitted in Message 3 (or Msg.3) to the BS 102. This RRC message can include UE resume ID, or UE-IMSI information indicating the ID of the UE 101. The indication information can indicates that the UE 101 has UL data associated with the DL data to be transmitted; the UE 101 has not any UL data to be transmitted; or whether the UE 101 has UL data to be transmitted is uncertain. The UE 101 can also transmit time information for transmitting the UL data in the case that the indication information indicates there is UL data to be transmitted. The time information can be included in the indication information. The time information for transmitting the UL data may indicate the time when the UE 101 will be ready to send the UL data, or when the UE 101 desires to send the UL data.

After receiving Message 3 from the UE 101, the BS 102 will ask DL data from the CN node according to the RRC message in Message 3, and transmit the DL data to the UE 101 in Message 4 (or Msg. 4) in step 317. Meanwhile, the BS 102 may determine whether to allocate or transmit a UL grant to the UE 101 for transmitting the UL data and when to transmit the UL grant to the UE 101 based on the indication information.

The information indicating whether the UL data is to be transmitted can be per UE level in some embodiments of the present application. For example, when the information is per UE level, the information may indicate that, with respect to a specific UE, there is UL data associated with the DL data to be transmitted, or there is no UL data associated with the DL data to be transmitted.

The information whether the UL data associated with the DL data is to be transmitted can be per the application-level in some other embodiments of the present application. The application-level can be mapped to service, traffic, bearer or logical channel level of the UE 101. That is, when the information is per application-level, the information is associated with the service, traffic, bearer, or logical channel-level of the UE 101. The information could be mapped to a dedicated service, traffic, bearer, or logical channel of the UE. The information may indicate: the UE will transmit UL data associated with the DL data; the UE will not transmit UL data associated with the DL data, or whether the UE will transmit the UL data associated with the DL data is uncertain.

More specifically, in some cases, the UE 101 will generate UL data associated with the DL data, the information may indicate that the UE will transmit the UL data associated with the DL data. In some other cases, the UE 101 will not generate any UL data associated with the DL data, and the information may indicate that the UE will not transmit the UL data associated with the DL data. In some other cases, the UE 101 itself is uncertain on whether it will generate the UL data associated with the DL data, and the information may indicate that the UE 101 is uncertain whether it will transmit the UL data associated with the DL data.

In some embodiments of the present application, in an MT-EDT procedure, the information indicating whether the UE will transmit the UL data associated with the DL data may be the information indicating whether the UE will generate the UL data associated with the DL data. Similarly, the information indicating whether the UE will generate the UL data associated with the DL data indicate: the UE will generate UL data associated with the DL data, the UE will not generate UL data associated with the DL data, or whether the UE will generate UL data associated with the DL data is uncertain. Persons skilled in the art should understand that although they are expressed in different manners, they actually have the same use or function, both for help the BS 102 determine whether it will receive UL data associated the DL data from the UE 101.

According to some embodiments of the present application, the UE 101 can indicate the BS 102 whether the UE 101 will transmit UL data by scheduling request (SR).

Figure 6:
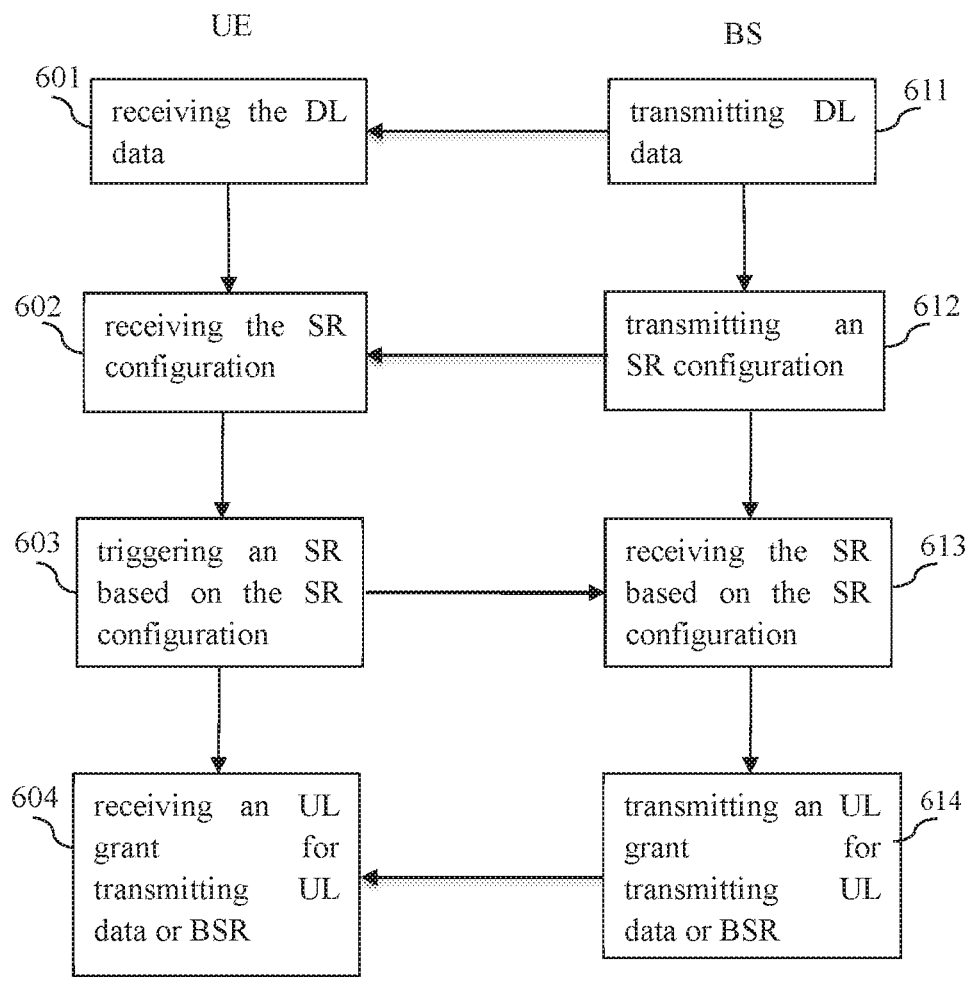
FIG. 6 illustrates a flow chart of a method for wireless communication in an MT-EDT procedure according to some embodiments of the present application.

FIG. 6 illustrates a flow chart of a method for wireless communication in an MT-EDT procedure according to some embodiments of the present application. The method shown in FIG. 6 is performed between a UE 101 and a BS 102. The MT-EDT procedure can be a Msg.2 based MT-EDT procedure or Msg.4 based MT-EDT procedure, wherein an SR timer is applied.

As shown in FIG. 6, in step 611, the BS may transmit DL data to the UE. Accordingly, in step 601, the UE may receive the DL data from the BS. The DL data transmitted in step 601 and step 611 may be in Msg.2 of the Msg.2 based MT-EDT procedure shown in FIG. 2 or Msg. 4 of the Msg.4 based MT-EDT procedure shown in FIG. 3.

The BS may also transmit an SR configuration to the UE in step 612. Accordingly, in step 602, the UE may receive the SR configuration from the BS. The SR configuration can be transmitted together with the DL data in some embodiments of the present application. The SR configuration in step 602 and step 612 may also be in Msg.2 of the Msg.2 based MT-EDT procedure or Msg.4 of the Msg.4 based MT-EDT procedure. In some embodiments of the present disclosure, the SR configuration can be a paging message in the Msg.2 based MT-EDT procedure or Msg.4 based MT-EDT procedure. In some embodiments of the present disclosure, the SR configuration can be broadcast in system information block (SIB) information. In some embodiments of the present application, the BS may transmit a timer for an SR based on the SR configuration in Msg.2 of the Msg.2 based MT-EDT or Msg. 4 of the Msg.4 based MT-EDT procedure. The timer can also be broadcast in system information block (SIB) information in some embodiments of the present application.

The UE may initiate the timer once receiving the timer or once transmitting a physical uplink control channel (PUCCH) ACK associated with the DL data, for example in step 216 in FIG. 2 or in step 318 in FIG. 3.

If the UE has UL data to be transmitted to the BS, the UE may trigger an SR based on the SR configuration before the timer expires in step 603. Accordingly, in step 613, the BS may receive the SR from the UE. Then, in step 614, the BS may transmit a UL grant to the UE so that the UE can transmit the UL data or a buffer status report (BSR) associated with the SR for the UE. Accordingly, in step 604, the UE may receive the UL grant for the UL data or BSR, so the UE can transmit the UL data and or BSR to the BS. The UL data may be associated with the DL data. In some embodiments of the present application, the UL data could include the information of BSR. In some embodiments of the present application, the UL data could be a new transmission. The SR could be used for requesting uplink shared channel (UL-SCH) resources for new transmission.

In the case that the BS receives the SR, the BS could set a UE fallback to be in a RRC connected mode in Msg.4. or set the UE fallback to be in an active mode.

However, in the case that the UE does not have UL data to be transmitted, the UE will not trigger an SR based on the SR configuration before the timer for an SR expires. In the case that the timer expires and the UE does not trigger an SR, the UE will enter an idle mode or an inactive status. The BS will suspend all information of the UE and notice the corresponding CN node to release the bearer of the UE. In some embodiments of the present application, the BS may notice the UE into RRC IDLE or RRC inactive status by RRC message, and notice the corresponding CN node to release or suspend the bearer of the UE. The UL data may be associated with the DL data.

According to some embodiments of the present application, the BS can determine that it is impossible for the UE to transmit UL data associated with the DL data according to previous information, which can be computed based the UE history behavior information, or from the CN node's information. The BS may transmit information including next hop chain counter (NCC), resume ID for UP for releasing the UE in Msg.2 or Msg.4 with the SR configuration together.

According to some embodiments of the present application, an SR timer may not be applied.

If the UE has UL data to be transmitted to the BS, the UE may trigger an SR based on the SR configuration with PUCCH ACK or NACK associated with the DL data. Accordingly, in step 613, the BS may receive the SR with PUCCH ACK or NACK associated with the DL data on the same PUCCH. Then, in step 614, the BS may transmit a UL grant to the UE so that the UE can transmit the UL data or a BSR. Accordingly, in step 604, the UE may receive the UL grant for the UL data or BSR, and the UE can transmit the UL data and/or BSR to the BS. The UL data may be associated with the DL data. In some embodiments, the UL data could include the information of BSR. In some other embodiments, the UL data could be a new transmission. The SR could be used for requesting UL-SCH resources for new transmission.

In some other embodiments of the present application, if the UE has UL data to be transmitted to the BS, the UE may trigger an SR based on the SR configuration. Accordingly, in step 613, the BS may receive the SR from the UE. Then, in step 614, the BS may transmit a UL grant to the UE so that the UE can transmit the UL data or a BSR. Accordingly, in step 604, the UE may receive the UL grant for the UL data or BSR, and the UE can transmit the UL data and/or BSR to the BS. The UL data may be associated with the DL data. In some embodiments, the UL data could include the information of BSR. In some other embodiments, the UL data could be a new transmission. The SR could be used for requesting UL-SCH resources for new transmission.

In the case that the BS receives the SR, the BS could set a UE fallback to be in a RRC connected mode in Msg.4. or set the UE fallback to be in an active mode.

However, in the case that the UE does not have any UL data to be transmitted, the UE will not trigger an SR based on the SR configuration with PUCCH ACK or NACK associated with the DL data. That is, only the PUCCH ACK or NACK associated with the DL data is transmitted. The PUCCH ACK associated with the DL data is transmitted. In the case that the UE does not trigger an SR with PUCCH ACK or NACK, or UE does not trigger an SR with PUCCH ACK or NACK when PUCCH ACK is transmitted, the UE will enter an idle mode or an inactive status. The BS will suspend all information of the UE and notice the corresponding CN node to release the bearer of the UE. In some embodiments of the present application, the BS may notice the UE into a RRC IDLE or RRC inactive status by a RRC message. The BS may notice the corresponding CN node to release or suspend the bearer of the UE. The UL data may be associated with the DL data. In some embodiments, the UL data could include the information of BSR. In some other embodiments, the UL data could be a new transmission.

In some embodiments of the present application, in the case that the UE does not have any UL data to be transmitted, the UE will not trigger an SR based on the SR configuration. In the case that the UE does not trigger an SR, or the UE does not trigger an SR when PUCCH ACK is transmitted, the UE will enter an idle mode or an inactive status. The BS will suspend all information of the UE and notice the corresponding CN node to release the bearer of the UE. In some embodiments of the present application, the BS may notice the UE into a RRC IDLE or RRC inactive status by a RRC message, and notice the corresponding CN node to release or suspend the bearer of the UE. The UL data may be associated with the DL data. In some embodiments, the UL data could include the information of BSR. In some other embodiments, the UL data could be a new transmission.

According to some embodiments of the present application, once a UE receives its MT-EDT indication in a paging message, the UE needs to trigger an MT-EDT procedure. However, at this time, if the UE has UL data to be transmitted, the baseline is that the UE could ask for a UL grant by an SR or BSR reporting after receiving the DL data in Msg.2 of the Msg.2 based MT-EDT procedure or Msg.4 of the Msg.4 based MT-EDT procedure. Considering the resource efficiency and latency, MT-EDT with a mobile originating (MO) EDT (MO-EDT) indication is used for a Msg.2 based MT-EDT procedure, MO-EDT may be used for a Msg.2 based MT-EDT procedure.

For example, when the UE receives a paging message with MT-EDT indication but still has UL data to be transmitted, the UE may initiate a Msg.2 based MT-EDT procedure in the case that the Msg.2 based MT-EDT procedure is applied; or the UE may initiate an MO-EDT procedure in the case that the Msg.4 based MT-EDT procedure is applied. Specific embodiments on the two schemes will be described respectively in detail in FIGS. 7 and 8.

Figure 7:
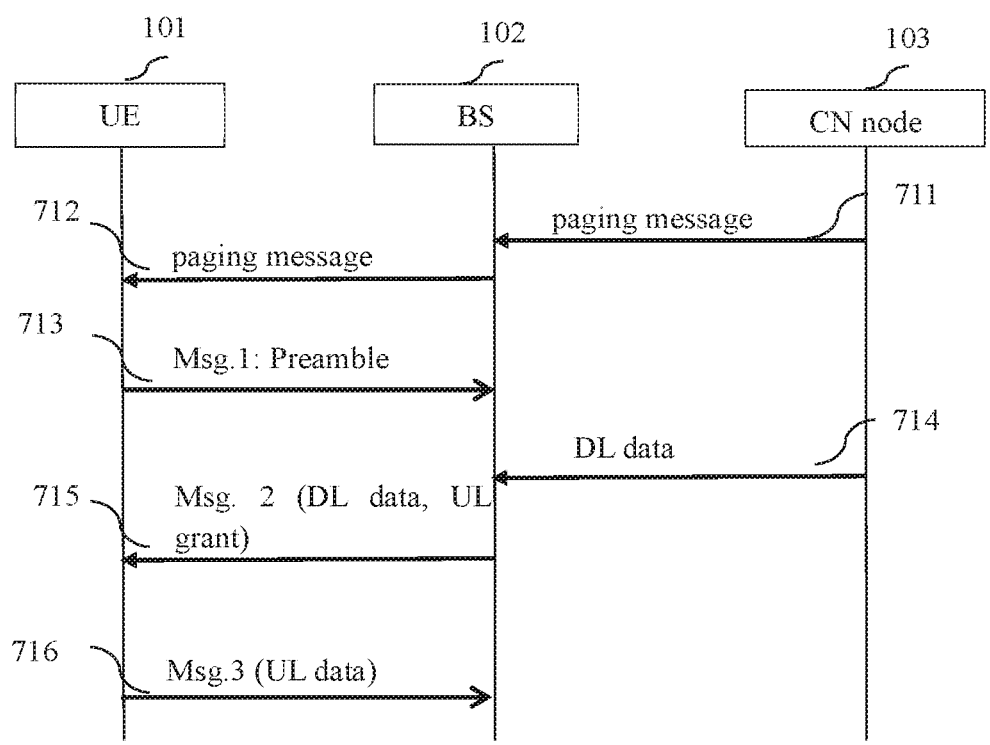
FIG. 7 is another schematic view of message transmission in a Msg.2 based MT-EDT procedure according to some embodiments of the present application.

FIG. 7 is another schematic view of message transmission in a Msg.2 based MT-EDT procedure in accordance with some embodiments of the present application.

As shown in FIG. 7, in step 711, a CN node 103 may transmit a paging message including UE ID and DL data information to a BS 102.

Once receiving the paging message, in step 712, the BS 102 may transmit a paging message including pre-configured information such as an MT-EDT indication, a dedicated RACH resource, and possible UE-specific RNTI information for indicating UE ID, to the UE 101. Specifically, the dedicated RACH resource may include a dedicated RACH resource for MO-EDT&MT-EDT, and dedicated RACH resource for MT-EDT. In some embodiments of the present application, a dedicated RACH resource means at least one of the time resource, frequency resource, or RA preamble resource.

After receiving the paging message, in step 713, the UE 101 may find its UE ID in the paging message. However, in some cases, the UE 101 still has UL data to be transmitted to be BS 102. Then in step 713, the UE 101 will transmit a RA preamble to the BS 102 in Message 1 (or Msg.1) of MT-EDT. Specially, the UE 101 will transmit the information indicating there is UL data to be transmitted on a dedicated RACH resource for the MO-EDT and MT-EDT procedure with the RA preamble in in Message 1 (or Msg.1) of MT-EDT. Otherwise, if the UE 101 does not have UL data to be transmitted, it will choose the dedicated RACH resource for MT-EDT to transmit the RA preamble.

The BS 102 will monitor the preamble from the RACH resource. After receiving the RA preamble and the information on the dedicated RACH resource for the UE 101 (that is, the dedicated RACH resource for the MO-EDT and MT-EDT procedure), the BS 102 will be aware of that the UE has UL data to be transmitted. The BS 102 will ask DL data from the CN node 103, such as an MME for CP or an S-GW for UP, or an AMF for CP, or a UPF for UP.

After the BS 102 receives the DL data from the CN node 103 in step 714, the BS 102 will configure a UL grant for the UL data. The BS 102 can transmit the DL data together with the UL grant to the UE 101 in Message 2 (or Msg. 2) of MT-EDT in step 715.

After receiving the UL grant, the UE 101 will transmit the UL data in Message 3 (or Msg. 3) of MT-EDT in step 716. Moreover, after successfully receiving the DL data, the UE 101 may also transmit an ACK associated with the DL data or a RRC message to the BS 102 in Message 3 (or Msg. 3) of MT-EDT in step 716.

In some other embodiments, the paging message received by the UE 101 in step 712 may include a dedicated RACH resource for the MT-EDT procedure and an offset to the dedicated RACH resource for the MT-EDT procedure, instead of including the dedicated RACH resource for the MO-EDT and MT-EDT procedure. In this case, in step 713, the UE 101 may transmit the RA preamble and the information indicating there is UL data to be transmitted on a dedicated RACH resource with an offset to the RACH resource for an MT-EDT procedure. The BS 102 will receive the RA preamble and the information based on the offset to the dedicated RACH resource for the MT-EDT procedure. For example, the offset could be an offset to the preamble index of dedicated RACH resource for MT-EDT, or an offset to the frequency and/or time resource of dedicated RACH resource for MT-EDT.

In some embodiments of the present application, the offset may be a number associated to a time resource and frequency resource of the RACH resource. In some other embodiments, the offset may be a number associated to a time resource, frequency resource and RA preamble resource of the RACH resource. In some other embodiments, the offset may be a number associated to a RA preamble resource of the RACH resource. In some other embodiments, the offset may be a number associated to at least one of a time resource, frequency resource and RA preamble resource of the RACH resource.

Figure 8:
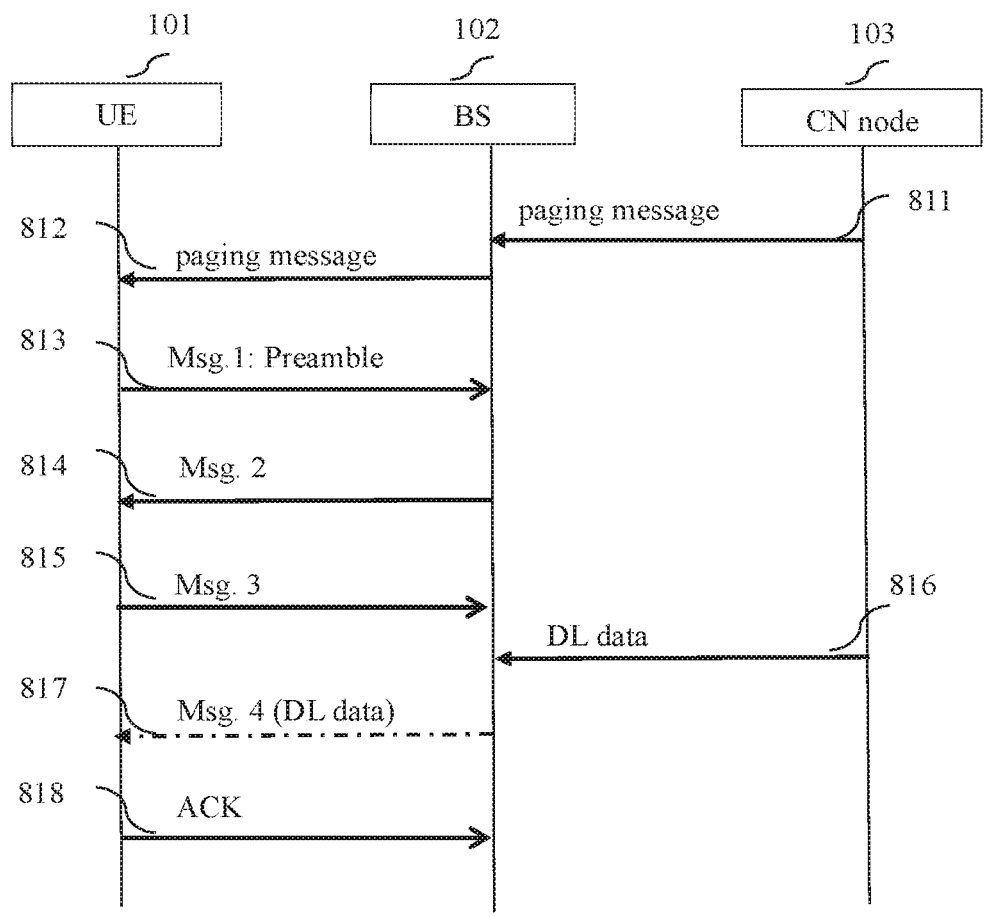
FIG. 8 is another schematic view of message transmission in a Msg.4 based MT-EDT procedure according to some embodiments of the present application.

For a Msg.4 based MT-EDT procedure, the UE will initiate the MO-EDT procedure. FIG. 8 is another schematic view of message transmission in a Msg.4 based MT-EDT procedure according to some embodiments of the present application.

As shown in FIG. 8, the CN node 103 can transmit a paging message including UE ID and DL data information to the BS 102 in step 811.

after receiving the paging message, the BS 102 can transmit a paging message information including pre-configured information in step 812, such as an MT-EDT indication, a RACH resource, and possible UE-specific RNTI information for indicating UE ID.

After receiving the paging message in step 813, the UE may find its UE ID in the paging message. However, in some case, the UE 101 still has UL data to be transmitted. In step 813, the UE 101 will transmit a RA preamble in Message 1 (or Msg.1) of MT-EDT and MO-EDT to the BS 102 according to the RACH resource in the paging message. Since the Msg.4 based MT-EDT procedure is a contention-based RA procedure, the RACH resource could be shared by other UEs besides the UE 101 transmitting Msg.4.

The BS 102 can determine whether there is UL data to be received after receiving the RA preamble from the UE 101, that is, whether the UE 101 has UL data to be transmitted. In step 814, the BS will send a random access response (RAR) and a UL grant for the UL data (i.e., Message 2 (or Msg.2) of MT-EDT) to the UE 101 in the case that the BS determines that there is UL data to be received.

After receiving the RAR information and the UL grant, in step 815, the UE 101 can send an RRC message and/or the UL data in Message 3 (or Msg.3) of MT-EDT to the BS 102. This RRC message can include UE resume ID, or UE-IMSI information indicating its UE ID. After monitoring the RRC message from the UE 101, the BS 102 can identify the UE ID information, and will ask DL data from the CN node 103, e.g., MME, S-GW, AMF, or UPF.

After receiving the DL data from CN node 103 in step 816, the BS 102 will transmit the DL data to the UE 101 in Message 4 (or Msg. 4) of MT-EDT in step 817.

After successfully receiving the DL data, the UE 101 will transmit a PUCCH ACK associated with the DL data or a RRC message to the BS 102 in step 818.

In some embodiments of the present application, the UE 101 may need longer time to the DL data due to the BS 102 asking DL data from the CN node 103. Thus, after transmitting Msg.3, the UE 101 will wait for a time offset for the MO-EDT procedure and MT-EDT procedure. The UE 101 will monitor the PUCCH for receiving the DL data. The offset may be configured by SIB information, or by dedicated RRC signaling, or by Msg.2 from the BS 102.

According to some embodiments of the present application, after a UE receives its MT-EDT indication in a paging message, the UE needs to trigger an MT-EDT procedure. During the MT-EDT procedure, the UE may determine it may have UL data to be transmitted, thus the UE will transmit the information indicating whether the UL data is to be transmitted to the BS. The UL data may be not associated with the DL data.

Figure 9:
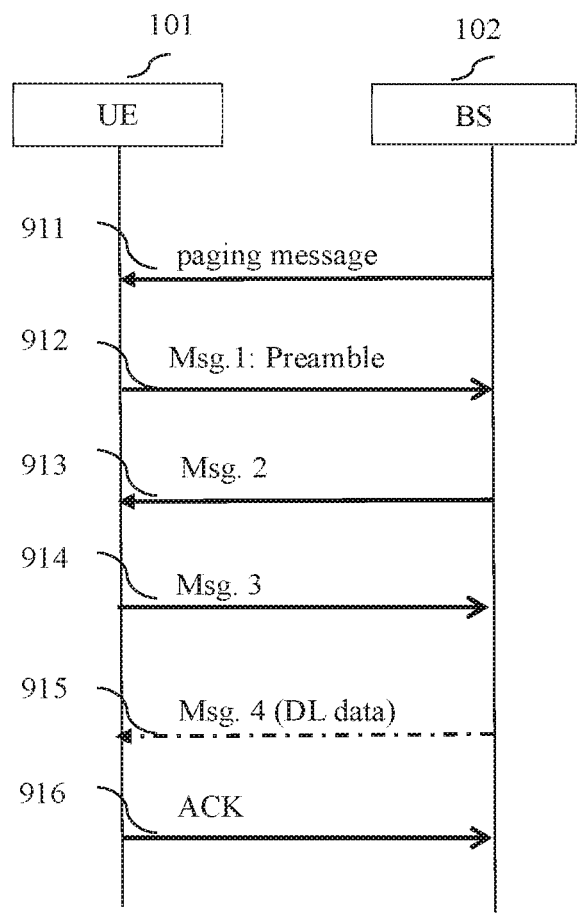
FIG. 9 illustrates a flow chart of a method for wireless communication in an MT-EDT procedure according to some embodiments of the present application.

FIG. 9 illustrates a flow chart of a method for wireless communication in an MT-EDT procedure according to some embodiments of the present application. The method shown in FIG. 9 is performed between a UE 101 and a BS 102. The MT-EDT procedure can be a Msg.4 based MT-EDT procedure.

As shown in FIG. 9, after receiving a paging message from a CN node (not shown in FIG. 9), the BS 102 can transmit the paging message information including pre-configured information in step 911, such as an MT-EDT indication, a RACH resource, and possible UE-specific RNTI information for indicating UE ID.

After receiving the paging message, the UE 101 may find its UE ID in the paging message. However, in some cases, the UE 101 may have UL data to be transmitted. In step 913, the UE 101 will transmit a RA preamble in Message 1 (or Msg.1) to the BS 102 according to a RACH resource in the paging message.

In step 913, the BS 102 will send a RAR to the UE 101. After receiving the RAR information, the UE 101 can send a RRC message and indication information indicating whether indicating whether the UE 101 has UL data is to be transmitted in Message 3 (or Msg.3) to the BS 102. This RRC message can include UE resume ID, or UE-IMSI information indicating the ID of the UE 101. The indication information can indicates that the UE 101 has UL data to be transmitted; the UE 101 has not any UL data to be transmitted; or whether the UE 101 has UL data to be transmitted is uncertain. The UE 101 can also transmit time information for transmitting the UL data in the case that the indication information indicates there is UL data to be transmitted. The time information can be included in the indication information. The time information for transmitting the UL data may indicate the time when the UE 101 will be ready to send the UL data, or when the UE 101 desires to send the UL data.

After receiving Message 3 from the UE 101, the BS 102 will ask DL data from the CN node according to the RRC message in Message 3, and transmit the DL data to the UE 101 in Message 4 (or Msg. 4) in step 915. Meanwhile, the BS 102 will receive the indication information indicating whether the UL data is to be transmitted, and the BS 102 may determine whether to allocate or transmit a UL grant to the UE 101 for transmitting the UL data and when to transmit the UL grant to the UE 101 based on the indication information.

The information indicating whether the UL data is to be transmitted can be per UE level in some embodiments of the present application. For example, when the information is per UE level, the information may indicate that, with respect to a specific UE, there is UL data to be transmitted, or there is no UL data to be transmitted.

The information whether the UL data is to be transmitted can be per the application-level in some other embodiments of the present application. The application-level can be mapped to service, traffic, bearer or logical channel level of the UE 101. That is, when the information is per application-level, the information is associated with the service, traffic, bearer, or logical channel-level of the UE 101. The information could be mapped to a dedicated service, traffic, bearer, or logical channel of the UE. The information may indicate: the UE will transmit UL data; the UE will not transmit UL data, or whether the UE will transmit the UL data is uncertain.

More specifically, in some cases, the UE 101 will generate UL data, the information may indicate that the UE will transmit the UL data. In some other cases, the UE 101 will not generate any UL data, and the information may indicate that the UE will not transmit the UL data. In some other cases, the UE 101 itself is uncertain on whether it will generate the UL data and the information may indicate that the UE 101 is uncertain whether it will transmit the UL data.

In some embodiments of the present application, in an MT-EDT procedure, the information indicating whether the UE will transmit the UL data may be the information indicating whether the UE will generate the UL data. Similarly, the information indicating whether the UE will generate the UL data: the UE will generate UL data, the UE will not generate UL data, or whether the UE will generate UL data is uncertain. Persons skilled in the art should understand that although they are expressed in different manners, they actually have the same use or function, both for help the BS 102 determine whether it will receive UL data associated the DL data from the UE 101.

In some embodiments of the present application, in an MT-EDT procedure, the information indicating whether the UE will transmit the UL data may be the information indicating whether UE intends to transmit UL data as feedback of the DL data, or indicating whether UE intends to send UL response to the DL data.

Above steps on information transmitting or receiving could be used in other RA procedure. The other RA procedure could be 2-steps RA procedure, normal RA procedure, 4-steps RA procedure. Or, the other RA procedure could be used in normal RRC connection establishment, RRC connection re-establishment, RRC connection resume, or RRC connection re-establishment procedure.

Figure 10:
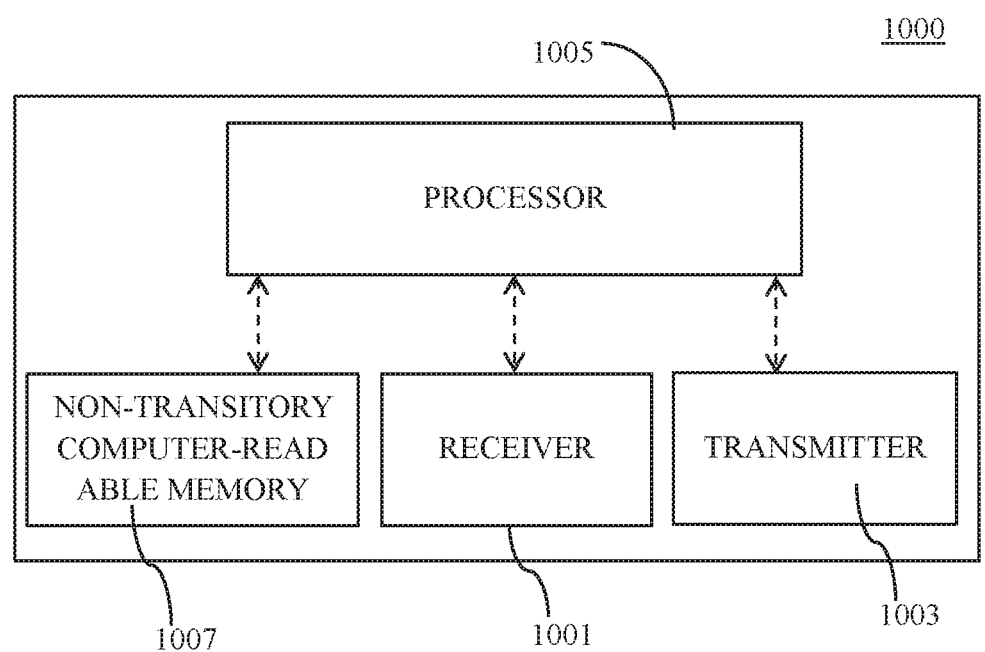
FIG. 10 illustrates an apparatus according to some embodiments of the present application.

FIG. 10 illustrates an apparatus according to some embodiments of the present application. In some embodiments of the present disclosure, the apparatus 1000 may be a UE 101 as illustrated in FIG. 1 or other embodiments of the present application.

As shown in FIG. 10, the apparatus 1000 may include a receiver 1001, a transmitter 1003, a processor 1005, and a non-transitory computer-readable medium 1007. The non-transitory computer-readable medium 1007 has computer executable instructions stored therein. The processor 1005 is configured to be coupled to the non-transitory computer readable medium 1007, the receiver 1001, and the transmitter 1003. It is contemplated that the apparatus 1000 may include more computer-readable mediums, receiver, transmitter and processors in some other embodiments of the present application according to practical requirements. In some embodiments of the present application, the receiver 1001 and the transmitter 1003 are integrated into a single device, such as a transceiver. In certain embodiments, the apparatus 1000 may further include an input device, a memory, and/or other components.

In some embodiments of the present application, the non-transitory computer-readable medium 1007 may have stored thereon computer-executable instructions to cause a processor to implement the method according to embodiments of the present application.

Figure 11:
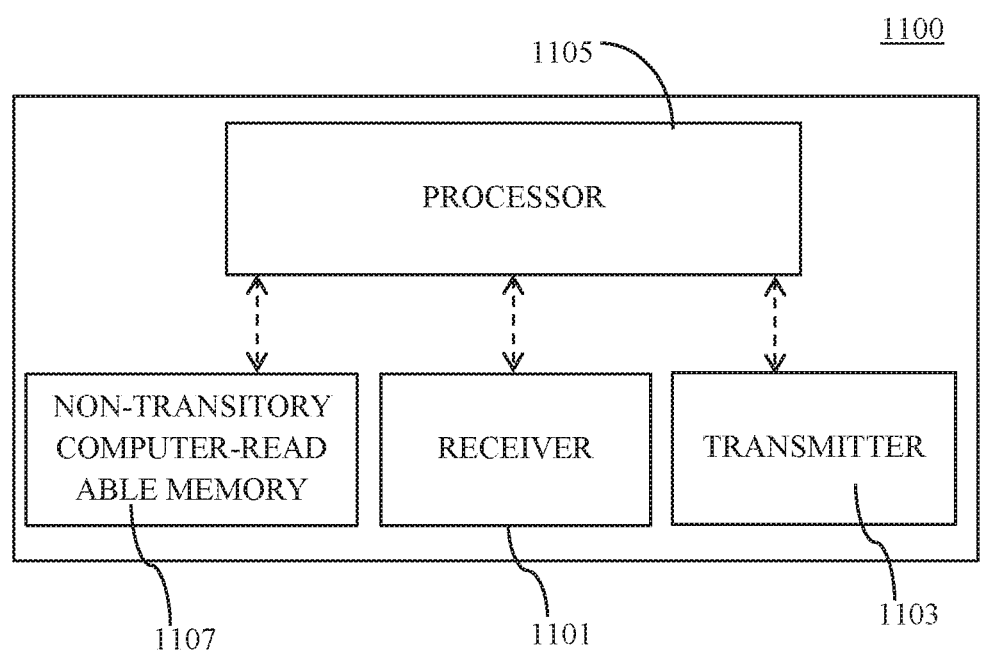
FIG. 11 illustrates another apparatus according to some other embodiments of the present application.

FIG. 11 illustrates another apparatus according to some embodiments of the present application. In some embodiments of the present disclosure, the apparatus 1100 may be a BS 102 as illustrated in FIG. 1 or other embodiments of the present application.

As shown in FIG. 11, the apparatus 1100 may include a receiver 1101, a transmitter 1103, a processor 1105, and a non-transitory computer-readable medium 1107. The non-transitory computer-readable medium 1107 has computer executable instructions stored therein. The processor 1105 is configured to be coupled to the non-transitory computer readable medium 1107, the receiver 1101, and the transmitter 1103. It is contemplated that the apparatus 1100 may include more computer-readable mediums, receiver, transmitter and processors in some other embodiments of the present application according to practical requirements. In some embodiments of the present application, the receiver 1101 and the transmitter 1103 are integrated into a single device, such as a transceiver. In certain embodiments, the apparatus 1100 may further include an input device, a memory, and/or other components.

In some embodiments of the present application, the non-transitory computer-readable medium 1107 may have stored thereon computer-executable instructions to cause a processor to implement the method according to embodiments of the present application.

Figure 12:
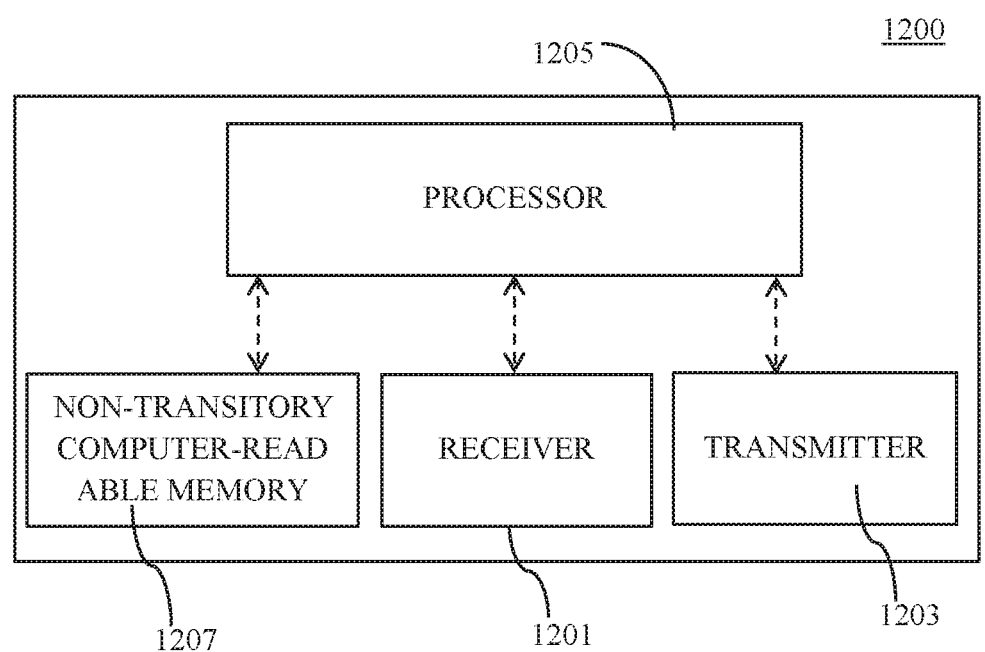
FIG. 12 illustrates yet another apparatus according to some yet other embodiments of the present application.

FIG. 12 illustrates yet another apparatus according to some embodiments of the present application. In some embodiments of the present disclosure, the apparatus 1200 may be a CN node illustrated in above embodiments of the present application.

As shown in FIG. 12, the apparatus 1200 may include a receiver 1201, a transmitter 1203, a processor 1205, and a non-transitory computer-readable medium 1207. The non-transitory computer-readable medium 1207 has computer executable instructions stored therein. The processor 1205 is configured to be coupled to the non-transitory computer readable medium 1207, the receiver 1201, and the transmitter 1203. It is contemplated that the apparatus 1200 may include more computer-readable mediums, receiver, transmitter and processors in some other embodiments of the present application according to practical requirements. In some embodiments of the present application, the receiver 1201 and the transmitter 1203 are integrated into a single device, such as a transceiver. In certain embodiments, the apparatus 1200 may further include an input device, a memory, and/or other components.

In some embodiments of the present application, the non-transitory computer-readable medium 1207 may have stored thereon computer-executable instructions to cause a processor to implement the method according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE), comprising:
at least one memory; and
at least one processor coupled with the at least one memory and configured to cause the UE to:

receive downlink (DL) data from a base station in a mobile terminated (MT) early data transmission (EDT) (MT-EDT) procedure;

determine whether to transmit uplink (UL) data associated with the DL data in the MT-EDT procedure; and transmit information indicating whether the UL data associated with the DL data is to be transmitted.

2. The UE of claim 1, wherein:

the information indicates whether the UL data associated with the DL data is to be transmitted to a core network (CN) node by non-access stratum (NAS) signaling.

3. The UE of claim 1, wherein the at least one processor is further configured to cause the UE to:

receive, from a core network (CN) node by non-access stratum (NAS) signaling, information indicating that the UL data associated with the DL data is to be transmitted.

4. The UE of claim 2, wherein the NAS signaling is transmitted in an Attach procedure or a tracking area updating (TAU) procedure.

5. The UE of claim 2, wherein the CN node is a mobility management entity (MME), a serving-gateway (S-GW), an access and mobility management function (AMF), or user plane function (UPF).

6. The UE of claim 1, wherein the information indicating whether the UL data associated with the DL data is to be transmitted is per UE level or per application-level.

7. The UE of claim 6, wherein, if the information indicating whether the UL data associated with the DL data is to be transmitted is per application-level, the information is associated with the service, traffic, bearer or logical channel level of the UE.

8. The UE of claim 1, wherein the information indicating whether the UL data associated with the DL data is to be transmitted indicates:

the UL data associated with the DL data is to be transmitted;

the UL data associated with the DL data is not to be transmitted; or whether to transmit the UL data associated with the DL data is uncertain.

9. The UE of claim 1, wherein:

the information includes time information for transmitting the UL data.

10. A base station, comprising:

a memory; and at least one processor coupled with the memory and configured to cause the base station to:

transmit downlink (DL) data to a user equipment (UE) in a mobile terminated (MT) early data transmission (EDT) (MT-EDT) procedure;

receive a paging message or a DL data arriving message from a core network (CN) node in the MT-EDT procedure, wherein the paging message or the DL data arriving message includes information indicating whether the UE will transmit uplink (UL) data associated with the DL data; and determine whether to receive the UL data associated with the DL data based on the paging message or the DL data arriving message.

11. The apparatus base station of claim 10, wherein the at least one processor is further configured to cause the base station to:

transmit the information indicating whether the UE will transmit the UL data associated with the DL data to the CN node.

12. The base station of claim 10, wherein the CN node is a mobility management entity (MME), a serving-gateway (S-GW), an access and mobility management function (AMF), or a user plane function (UPF).

13. The base station of claim 10, wherein the information indicating whether the UE will transmit the UL data associated with the DL data is per UE level or per application-level.

14. The base station of claim 13, wherein, if the information indicating whether the UE will transmit the UL data associated with the DL data is per application-level, the information is associated with the service, traffic, bearer or logical channel level of the UE.

15. The base station of claim 10, wherein the information indicating whether the UE will transmit the UL data associated with the DL data indicates that:

the UE will transmit the UL data associated with the DL data;

the UE will not transmit the UL data associated with the DL data; or whether the UE will transmit the UL data associated with the DL data is uncertain.

16. The base station of claim 10, wherein the at least one processor is further configured to cause the base station to:

receive information indicating whether the UE will transmit the UL data associated with the DL data from the UE, wherein the information includes time information for transmitting the UL data.

17. A method comprising:

determining whether a user equipment (UE) will transmit uplink (UL) data associated with downlink (DL) data from a base station in a mobile terminated (MT) early data transmission (EDT) (MT-EDT) procedure based on received information; and transmitting information indicating whether the UE will transmit the UL data associated with the DL data to the base station.

18. The method of claim 17, wherein the information indicating whether the UE will transmit the UL data associated with the DL data is transmitted via a paging message or a DL data arriving message.

19. The method of claim 17, wherein the received information is received from the UE via Non-access stratum (NAS) signaling and comprises the information indicating whether the UE will transmit the UL data associated with the DL data.

20. The method of claim 19, wherein the NAS signaling is received in an Attach procedure or a tracking area updating (TAU) procedure.

* * * * *